United States Patent [19]
Ueda et al.

[11] Patent Number: 6,004,890
[45] Date of Patent: Dec. 21, 1999

[54] HEAT-RESISTING MATERIAL

[75] Inventors: Takahisa Ueda; Terumasa Yamamoto, both of Sanda; Tatsuo Yamazaki, Osaka; Mamoru Shoji, Joetsu; Masachika Yaguchi, Tokyo, all of Japan

[73] Assignees: Mitsubishi Chemical Corporation; Nippon Pillar Packing Co., Ltd., both of Japan

[21] Appl. No.: 09/076,113

[22] Filed: May 12, 1998

[30] Foreign Application Priority Data

May 13, 1997 [JP] Japan ................................ 9-137702
Jun. 27, 1997 [JP] Japan ................................ 9-187714
Jun. 27, 1997 [JP] Japan ................................ 9-187715

[51] Int. Cl.$^6$ ............................ B32B 15/04; B32B 33/00
[52] U.S. Cl. ............................ 442/136; 428/74; 428/76; 428/920; 428/921; 442/352; 442/402; 442/406; 169/48
[58] Field of Search .................... 428/74, 76, 920, 428/921; 442/136, 352, 402, 406; 169/48

[56] References Cited

U.S. PATENT DOCUMENTS 4,737,326  4/1988  Wirth et al. ........................... 264/56

FOREIGN PATENT DOCUMENTS 2 529 541  1/1984  France .

OTHER PUBLICATIONS

Patent Abstracts of Japan vol. 018, No. 680 (C–1291) Dec. 21, 1994 & JP 06 271362A Sep. 27, 1994.
Patent Abstracts of Japan vol. 012, No. 091 (M–679) Mar. 24, 1988 & JP 62 228758 A Oct. 7, 1997.

*Primary Examiner*—Terrel Morris
*Assistant Examiner*—Ula Ruddock
*Attorney, Agent, or Firm*—Nixon & Vanderhye

[57] ABSTRACT

The heat-resisting material according to the present invention comprises a fiber aggregate containing crystalline alumina short fibers and formed in a continuous length and an inflammable sheathing for maintaining the shape of the fiber aggregate in a compressed state. The expansion percentage of the fiber aggregate after burn-off of the sheathing is not less than 10% by volume based on the volume of fiber aggregate in a compressed state. This heat-resisting material can be worked into various forms of product of the heat-resisting material such as rope, square bar, sheet, etc., according to the purpose of use. The present heat-resisting material is provided in continuously long products, has high heat resistance and restoring property, and can be easily applied to the openings or spaces ranged continuously in the longitudinal direction, such as the boundaries between the blocks of the heat-resisting material and joints.

44 Claims, 6 Drawing Sheets

HEAT-RESISTING MATERIAL

BACKGROUND OF THE INVENTION

The present invention relates to a heat-resisting material, and particularly, to a heat-resisting material used as a heat-insulating material or a joint packing for high-temperature furnaces and high-temperature ducts, having high heat resistance and restoring property as well as an excellent workability.

Heat-resisting materials are commonly used as heat-insulating material or joint packing on the wall surfaces or at the joints of the high-temperature furnaces, high-temperature ducts and like equipment. Various types of heat-resisting material, such as those comprising amassed alumina-based or alumina-silica-based ceramic fibers and those produced by adding an expansive material such as vermiculite to the ceramic fibers, have been proposed.

For example, Japanese Patent Publication (KOKOKU) No. 7-115962 discloses a composite heat-insulating material (composite heat-resisting material) comprising a heat-expansive core composed of sepiolite, vermiculite, ceramic fiber and an organic binder and a heat-insulating material (sheathing material) comprising alumina-based or alumina-silica-based ceramic fibers, the core being partially or entirely sheathed with the heat-insulating material. Such a composite heat-insulating material can make up for the heat shrinkage of ceramic fibers by virtue of expansion of the heat-expansive core, so that there has no risk of causing formation of spaces or cracks when used at the joints of high-temperature furnaces or such equipment.

This heat-resisting material of Japanese Patent Publication (KOKOKU) No. 7-115962, however, involves the problem that the expansive material used therein is susceptible to heat deterioration with shrinkage of the fibers under placed under a high-temperature condition of not less than 600° C., so that when the heat-resisting material is applied to the boundaries between the blocks of the same heat-resisting material or the joints of equipment, there may be formed openings or spaces at such portion, or the applied heat-resisting material itself may be cracked, causing a reduction of its heat-insulating effect and/or sealing effect. Further, in case of applying the heat-resisting material to the boundaries between blocks thereof or joints thereof in expectation of the possible contraction percentage of the fibers in use under a high-temperature condition, there is required volumetrically massive compression molding, which gives rise to the problems in working of the material.

As a results of the earnest studies, it has been found that by the combination of a fiber aggregate as a core material, comprising specific crystalline alumina short fibers having excellent heat resistance, and a sheathing for maintaining the initial shape of the core fiber aggregate, the above-mentioned problems have been solved. On the basis of the finding, the present invention has been attained.

Further, this composite heat-insulating material is unsatisfactory in expansion percentage as a whole. Also, since the quality of the composite heat-insulating material mostly depends on the heat resisting properties of the heat-expansive material constituting the core, such composite heat-insulating material is unsuitable in use at high temperatures of not less than 800° C.

SUMMARY OF THE INVENTION

The object of the present invention is to provide a heat-resisting material having high heat resistance and restoring property as well as an excellent workability, which material has been properly compressed and is offered in continuously long products so that it can be easily applied to the spaces or openings ranging in the longitudinal direction, such as the boundaries between the blocks composed of the same heat-resisting material or the joints in the high-temperature equipment.

To accomplish the aim, in a first aspect of the present invention, there is provided a heat-resisting material comprising:

a fiber aggregate formed in a continuously long product, which comprises crystalline alumina-based short fibers, and an inflammable sheathing for maintaining the shape of the fiber aggregate in a compressed state, and having an expansion percentage after consumption (burn-off) of the sheathing of not less than 10% by volume based on the volume of fiber aggregate in a compressed state.

In a second aspect of the present invention, there is provided a heat-resisting material comprising:

a fiber aggregate formed in a continuously long product, which comprises crystalline alumina-based short fibers, and an inflammable sheathing for maintaining the shape of the fiber aggregate in a compressed state, the fiber aggregate being compressed to an amount of not less than 10% by volume based on the volume of fiber aggregate in the normal state by the sheathing.

In the heat-resisting material according to the second aspect of the present invention, the fiber aggregate may be a stratiform laminate of crystalline alumina-based short fibers and ceramic short fibers. Also, in the heat-resisting material according to the second aspect, the fiber aggregate may be composed of crystalline alumina-based short fibers and a heat-expansive material.

DETAILED DESCRIPTION OF THE INVENTION

Figure 1:
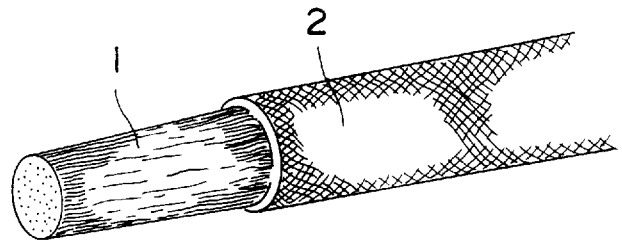
FIG. 1 is a partly broken-out perspective view of a rope-like product of the heat-resisting material according to the present invention.

The heat-resisting material of the present invention comprises (1) a fiber aggregate comprising crystalline alumina-based short fibers and formed in a continuously long product (hereinafter referred to as "fiber aggregate") and (2) an inflammable sheathing for maintaining the shape of the fiber aggregate in a compressed state. This heat-resisting material is advantageously used as, for instance, a heat-insulating material or a joint packing for the high-temperature furnaces and like equipment.

The fiber aggregate (1) used in the present invention is an aggregate or mass of alumina-based short fibers laminated to a substantially uniform balk density, and it comprehends the fiber masses generally called "bracket" or "block". The alumina-based fibers used in the present invention are usually the ones having a fiber diameter of 1 to 50 μm and a fiber length of 0.5 to 500 mm, and in view of restoring force and shape retention, it is preferred to use the alumina-based fibers having a fiber diameter of 3 to 8 μm and a fiber length of 0.5 to 300 mm.

The alumina-based fibers are preferably alumina-silica crystalline short fibers in which the alumina/silicon ratio (by weight) is 70/30 to 99/1 (calculated as $Al_2O_3$ and $SiO_2$). Mullite fibers with an alumina content of 72 to 85 wt % is more preferred because of excellent high-temperature stability and elasticity.

The crystalline alumina fibers have a high heat resistance as compared with the non-crystalline ceramic fibers of the same alumina-silica type, and are very small in heat deterioration such as softening shrinkage observed in the non-crystalline ceramic fibers, so that the fiber aggregate of such crystalline alumina fibers has an excellent elasticity. Thus, the fiber aggregate (1) comprising the crystalline alumina short fibers in the present invention shows very high restoring force with a low bulk density and is minimized in change with temperature.

The inflammable sheathing (2) according to the present invention is constituted by a material which can be burned off at a temperature lower than the working temperature of the material and is capable of maintaining the shape of the fiber aggregate (1) in a fixed compressed state until the heat-resisting material is put to practical use as a heat-insulating material or joint packing. The sheathing (2) is usually made of natural fiber such as cotton, flax, etc., or chemical fiber such as rayon, nylon, polyester, etc. When long fibers are used for the sheathing (2), it is possible to provide a flat and smooth covering on the surface of the fiber aggregate (1), so that use of long fibers is preferred for applications where a high sealing property is required.

As for the structure of the sheathing (2), it may, for instance, be of the type which is secured to the fiber aggregate (1) by knitting, barrel-weaving, braiding or the like, or which is wound around the fiber aggregate (1). The sheathing (2) may also be a tape comprising an inflammable sheet such as paper or a film as far as it is capable of maintaining the shape of the fiber aggregate (1) in a compressed state.

In the heat-resisting material of the present invention, in order to enhance workability and shape retention of the fiber aggregate (1) after restoration, a reinforcing covering or wrap (3) may be provided on the inside of the sheathing (2). Such a reinforcing wrap (3) is made of a material which won't be burned off in use, such as metal wire, long ceramic fiber or the like. This reinforcing covering or wrap (3) is of a form which is capable of maintaining the shape of the fiber aggregate (1) in its perfectly restored shape, that is, in the shape in its normal state, and is disposed around the alumina-based short fiber aggregate. Therefore, the structure of the reinforcing covering or wrap (3) ought to be a flexible one which may be provided by knitting or braiding the metal wire, long ceramic fiber or the like.

In the heat-resisting material of the present invention which comprises (1) a fiber aggregate comprising crystalline alumina-based short fibers formed in a continuously long product and (2) an inflammable sheathing for maintaining the shape of the fiber aggregate in a compressed state, it is remarkable that the expansion percentage of the material under the high temperatures of not more than 1,200° C. in which the heat resistance of the alumina short fibers is well guaranteed after consumption of the sheathing, is usually not less than 10 vol %, preferably not less than 30 vol %, more preferably 50 to 300 vol % based on the volume of fiber aggregate in a compressed state and the spaces at the joints, etc., can be perfectly sealed with this material owing to the high restoring property of the compressed fiber aggregate (1).

Also, in the heat-resisting material of the present invention, it is preferred to use a fiber aggregate (1) which has been compressed by an amount usually not less than 10 vol %, preferably 20 to 70 vol % based on the volume of the fiber aggregate in the normal state by the sheathing (2) as this degree of compression makes it possible to obtain a satisfactory restoration percentage in practical use.

The "volume in the normal state" of the fiber aggregate is the apparent volume of the fiber aggregate as an intermediate product which has been almost regularly contoured by substantially aligning the composing fibers, with no sheathing (2) being yet provided, hence no external pressure being applied. It is also possible to use a fiber aggregate which has already been compressed to some extent by a pertinent means such as binder impregnation and covered with a sheathing (2).

The heat-resisting material of the present invention is produced by making a fiber aggregate (1) by bundling the alumina-based short fibers to a predetermined shape and size, and sheathing the fiber aggregate (1) with a sheathing material (2), the fiber aggregate (1) having been compressed to a degree usually not less than 10 vol % based on the volume of the fiber aggregate in the normal state. The sheathing (2), when for instance using braiding means, is formed by bundling the alumina short fibers and continuously braiding the fiber bundle while applying pressure on the outer periphery. In case of forming a reinforcing covering or wrap (3), the fiber aggregate (1) is covered with a reinforcing covering or wrap material and then the sheathing (2) is braided on the outermost peripheral surface thereof. The heat-resisting material of the present invention has excellent workability as the compression needed for the fiber aggregate (1) can be relatively small in amount.

The fiber aggregate (1) in the heat-resisting material obtained by the manner described above needs to have an appropriate bulk density which is selected according to the restoring force of the product. Specifically, the normal-state bulk density of the fiber aggregate (1), namely the bulk density of the fiber aggregate (1) before compressed is usually set to be about 0.05 to 0.3 g/cm³. When the normal-state bulk density of the fiber aggregate (1) is less than 0.05 g/cm³, the elastic force produced upon restoration may be insufficient to provide the desired sealing effect. When the normal-state bulk density of the fiber aggregate (1) exceeds 0.3 g/cm³, it may become difficult to conduct desired compression processing. The bulk density of the fiber aggregate (1) in the compressed state is usually around 0.1 to 0.6 g/cm³. When the compressed-state bulk density of the fiber aggregate (1) exceeds 0.6 g/cm³, the restoration percentage may be reduced. When the compressed-state bulk density is less than 0.1 g/cm³, the expansion percentage may lower.

The heat-resisting material of the present invention, in its practical use, needs to satisfy the condition that the restoration percentage of the fiber aggregate (1) under high temperatures of not more than 1,200° C., after burn-off of the sheathing (2), is usually not less than 10 vol %, preferably not less than 40 vol %, more preferably 60 to 120 vol % based on the volume of the fiber aggregate in the normal state. With this condition met, the fiber aggregate(1) shows excellent heat resistance and high restoring property at high temperatures of not more than 1200° C. after the sheathing (2) has burned off.

The heat-resisting material of the present invention suffers no heat deterioration, and is capable of producing excellent heat insulating effect and sealing effect, so that its use is diversified and finds particularly useful application as a sealant for high-temperature furnaces, heat-insulating material for the walls of such high-temperature furnaces, joint packing or sealant to be applied to the spaces or gaps between the insulator blocks or in the furnace walls, and sealant for high-temperature equipment.

In use of the heat-resisting material of the present invention, when exposed to a high-temperature oxidizing atmosphere, the inflammable sheathing (2) is burned off while the fiber aggregate (1) is restored to constitute a space-less heat insulating layer or fill up the spaces at the joints or other openings. Thus, since the heat-resisting material of the present invention is free from heat deterioration of the fibers constituting the fiber aggregate (1) and exhibits a high restoring property, there is not caused formation of the spaces or cracks and produces excellent heat insulating effect and sealing effect are manifested when used as heat-insulating material or joint packing. Further, in the heat-resisting material of the present invention having a reinforcing covering or wrap (3) disposed around the fiber aggregate (1), the reinforcing covering or wrap (3) serves for preventing fly-off of the fibers on the occasion of restoration of the fiber aggregate (1), so that this heat-resisting material is suited for use in an environment where an air stream tends to occur.

The preferred embodiments of use of the heat-resisting material of the present invention are explained below with reference to the drawings.

Figure 2:
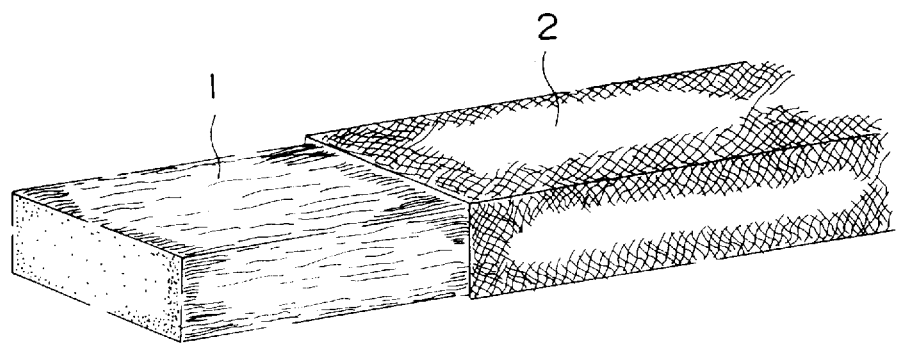
FIG. 2 is a partly broken-out perspective view of a square bar-like product of the heat-resisting material.
Figure 3:
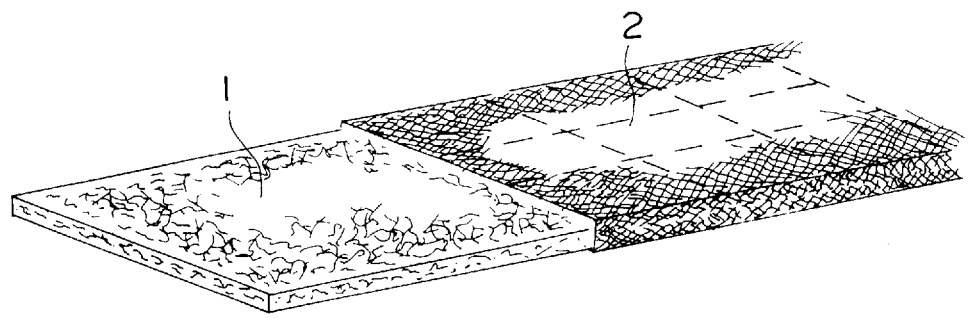
FIG. 3 is a partly broken-out perspective view of a sheet-like product of the heat-resisting material.
Figure 4:
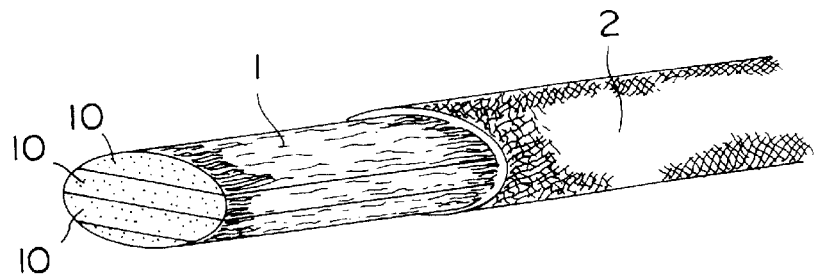
FIGS. 4 to 6 are the partly broken-out perspective views of the products of the heat-resisting material formed by laminating the properly cutting pieces of the sheet-like heat-resisting material.
Figure 5:
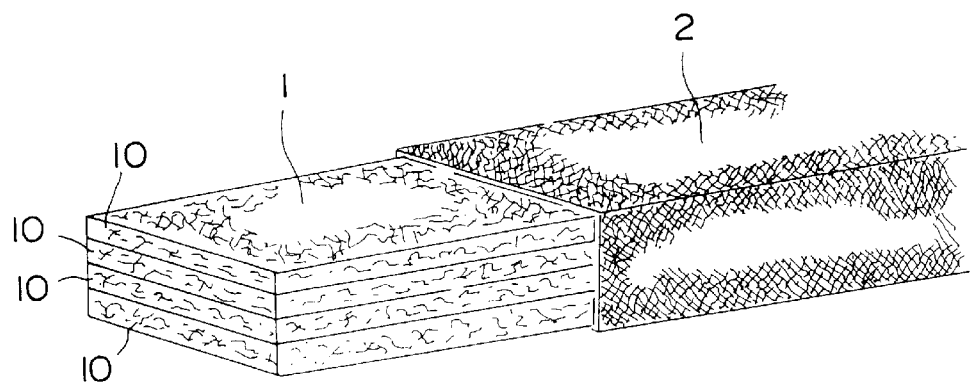
Figure 6:
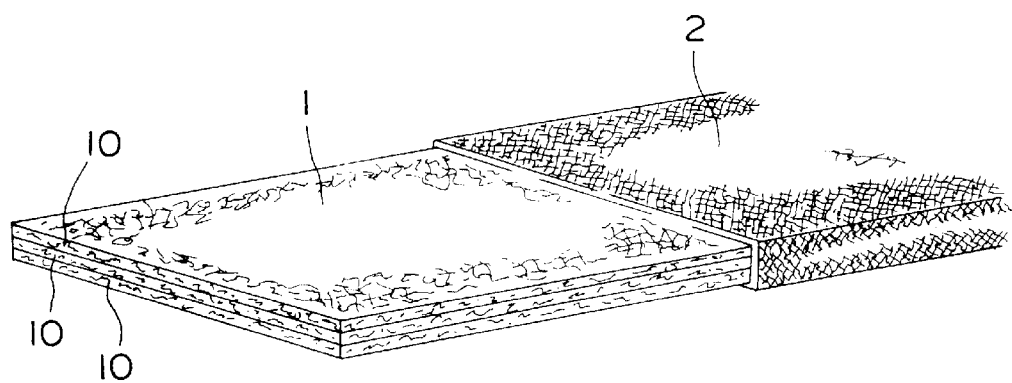
Figure 7:
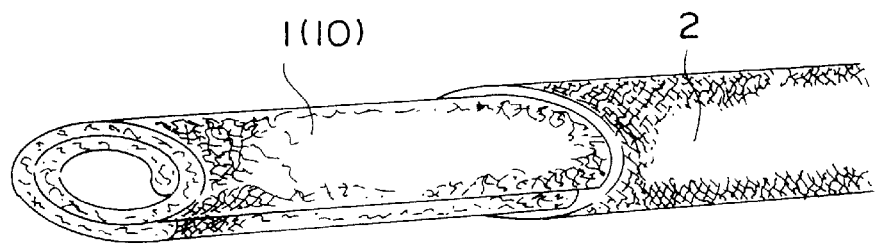
FIGS. 7 and 8 are the partly broken-out perspective views of the products of the heat-resisting material formed by rolling up a sheet-like heat-resisting material.
Figure 8:
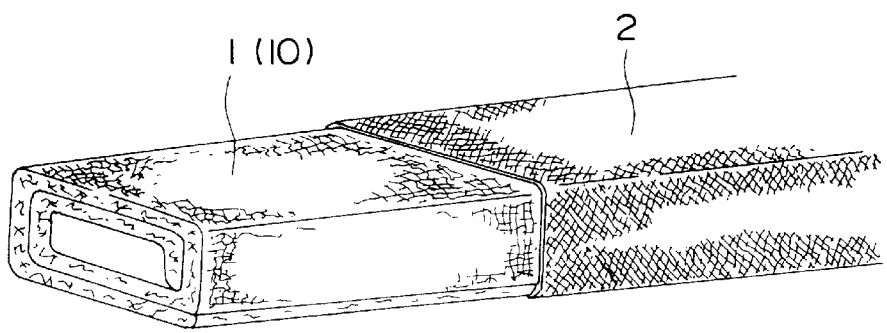
Figure 9:
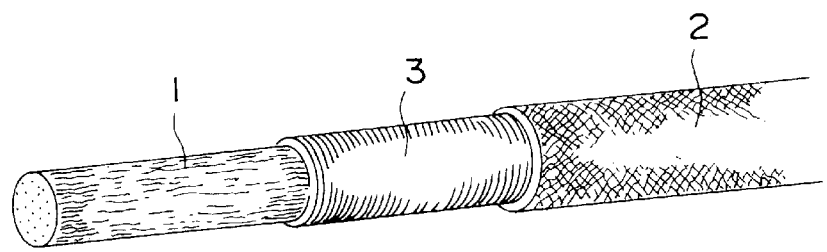
FIG. 9 is a partly broken-out perspective view of a product of the heat-resisting material formed by coiling a metal wire or ceramic long fibers around an alumina short fiber aggregate.

FIGS. 1 to 9 are the partly broken-out perspective views illustrating the products of the heat-resisting material according to the present invention, in which FIG. 1 shows a rope-like product of the heat-resisting material, FIG. 2 shows a square bar-like product of the heat-resisting material, FIG. 3 shows a sheet-like product of the heat-resisting material, FIGS. 4 to 6 show the products of the heat-resisting materials obtained by laminating a sheet-like heat-resisting material, FIGS. 7 and 8 show the products of the heat-resisting materials obtained by rolling a sheet-like heat-resisting material, and FIG. 9 shows a products of the heat-resisting material obtained by coiling a reinforcing covering around an aggregate of alumina-based short fibers. The heat-resisting material of the present invention can be made into various forms of products of the heat-resisting material such as shown in FIGS. 1 to 9 according to the purpose of use of the material and use conditions.

Referring to FIG. 1, there is shown a rope-like product of the heat-resisting material according to the present invention before burn-off of the sheathing (2) on the core fiber aggregate (1). Since this product of the heat-resisting material can be mounted by pertinently changing its shape, it is suited for application to sealing portions having interfitting grooves such as ordinary O-ring grooves or sealing portions having relatively narrow intervals, for example, sealing portions of a high-temperature soot-removing filter or the joints in the furnace walls.

FIG. 2 shows a square bar-like or elongated block-like product of the heat-resisting material before burn-off. This product of the heat-resisting material can be easily mounted to the deep rectilinear spaces, so that it is suited for use as a filler of the joints between the adjoining heat-insulating blocks or in the furnace wall, or a joint packing to be applied to the relatively wide spaces such as openings or crevices between doors or walls in the furnace.

FIG. 3 shows a sheet-like or belt-like product of the heat-resisting material before burn-off. This product can be obtained by first covering a flattened fiber aggregate (1) with a sheathing (2) and then passing a tie-yarn through the fiber aggregate (1) in its thickness direction, that is, conducting a quilting work. This sheet-like or belt-like product of the heat-resisting material has excellent shape retention properties and is capable of punching and cutting works, so that it can be favorably applied to uses where free shaping is desired, for example, in case of incorporating into sealing portions which are rather small in interval but have a relatively large area, such as joints of the heat-insulating material blocks or high-temperature ducts.

FIGS. 4 to 6 show the products of the heat-resisting material in which the fiber aggregate (1) has been constituted by laminating cutting pieces of sheet-like material (10) composed of alumina short fibers. These products of the heat-resisting materials show an excellent restoring property the laminating direction of the sheet-like material (10) and also have high dimensional stability in the plane direction of the sheet-like material (10), so that they are suited for use as joint packing between the heat-insulating material blocks differing in contraction percentage according to the direction, joint packing for furnace walls, and door packings. More specifically, the product of the heat-resisting material shown in FIG. 4, when the openings are mounted with the sheet-like material (10) being arranged in alignment to each other in the laminating direction thereof, the product of the heat-resisting material shows a sufficient restoring force in the spaced-apart direction of the openings, and also variation in the depth direction of the openings before and after mounting the product of the heat-resisting material is minimized. Further, since the fiber-cutting section is exposed at the edges of the laminated sheet-like material (10), a high resistive strength against external force is obtained.

FIGS. 7 and 8 show the products of the heat-resisting materials in which the fiber aggregate (1) has been formed by rolling a sheet-like material composed of alumina short fibers (10). This product of the heat-resisting material can be restored uniformly in the diametrical direction and also shows a high elasticity. Further, when the curled end of the sheet-like material (10) is set at a fixed position and is properly regulated, the product of the heat-resisting material demonstrates a stronger weathering resistance. Therefore, this product of the heat-resisting material is of especially high utility as various types of sealant which are required to have uniform and strong restoring force as well as a high weathering resistance.

In the products of the heat-resisting materials shown in FIGS. 4 to 8, it is preferable that the sheet-like materials (10) be needle-punched for allowing secure retention of the shape of the sheet-like materials (10) during working and restoration If the sheet-like materials (10) are needle-punched, it is possible to strengthen elasticity and restoring force in the thickness direction of the sheet-like material (10) and to prevent fly-off of the fibers in the fiber aggregate (1) even after the sheathing (2) has been burned off.

FIG. 9 shows a product of the heat-resisting material in which the fiber aggregate (1) is twined with a reinforcing covering material such as metal wire or long ceramic fiber, and a sheathing (2) is disposed therearound. Since the reinforcing covering or wrap (3) further prevents against fly-off of the fibers, this product of the heat-resisting material can suitably be applied to uses where a high-temperature gas flow urges removal or fly-off of the fibers in the fiber aggregate (1), such as sealing for the exhaustion system of internal combustion engines or high-temperature ducts. A reinforcing covering or wrap such as provided in the product of the heat-resisting material of FIG. 9 may as well be applied to the products of the heat-resisting materials shown in FIGS. 2 to 8.

In the heat-resisting material of the present invention described above, it is possible to use ceramic short fibers together with alumina short fibers for the fiber aggregate (1) in order to secure high heat-resisting properties and to improve workability. In this case, the mixing ratio (by weight) of alumina short fibers to ceramic short fibers in the fiber aggregate (1) is preferably 30:70 to 70:30. Such a fiber aggregate has a heat resistance against temperatures of 800 to 1,000° C., and further, since a part thereof is constituted with ceramic short fibers, the production cost can be reduced significantly. Even if the product of the heat-resisting material is exposed to a high temperature condition which may cause heat deterioration of the ceramic short fibers, the crystalline alumina short fibers in the fiber aggregate (1) remain safe from heat deterioration, so that the shape of the once restored fiber aggregate (1) can be maintained to some extent by dint of these alumina short fibers.

As the ceramic short fibers to be contained in the fiber aggregate (1), there can be used the ordinary ceramic fibers other than the crystalline alumina fibers, such as alumina-based or alumina/silica type ceramic fibers. These ceramic fibers used in the present invention are usually 1 to 2 $\mu$m in diameter and 40 to 250 mm in length. Also, the ceramic short fibers are of a composition in which the weight ratio of aluminum to silicon is 20:80 to 69:31 (calculated as $Al_2O_3$ and $SiO_2$). The ceramic fibers of such a composition has heat resistance against temperatures of up to about 1,000° C. Although these ceramic fibers are inferior to the alumina short fibers in elasticity and degree of heat resistance, the ceramic fibers have better mechanical strength at an ordinary temperature. Further, even if the product of the heat-resisting material is used under a temperature condition above a temperature of the heat resistance, the fiber aggregate can maintain its initial bulk density as a whole until the ceramic fibers are thermally deteriorated, so that use of these ceramic fibers is effective for maintaining the shape and rigidity necessary for working.

In case of using such ceramic short fibers in the products of the heat-resisting materials of the heat-resisting material of the present invention, a fiber aggregate (1) obtained by laminating the sheet-like materials of alumina short fibers (10) and the sheet-like materials of ceramic short fibers (12) in a stratified form is used. The sheet-like materials (10) and (12) may be in the form of blanket, paper or block.

Figure 10:
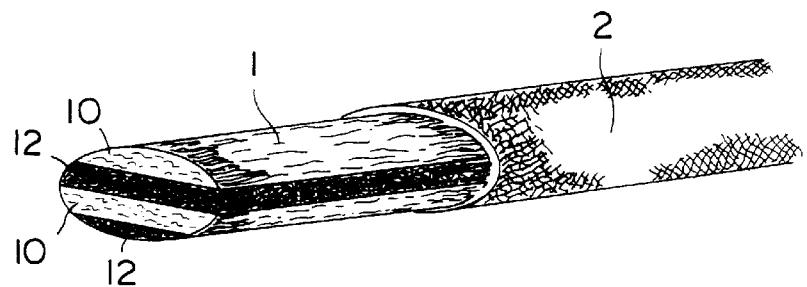
FIG. 10 is a partly broken-out perspective view of a rope-like product of the heat-resisting material (formed by laminating the properly cut sheets of the heat-resisting material).
Figure 11:
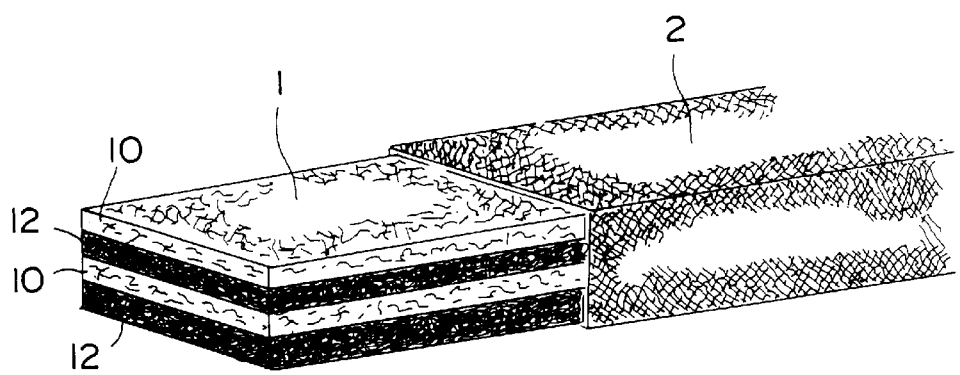
FIG. 11 is a partly broken-out perspective view of a square bar-like product of the heat-resisting material (formed by laminating the cut sheets of the heat-resisting material).
Figure 12:
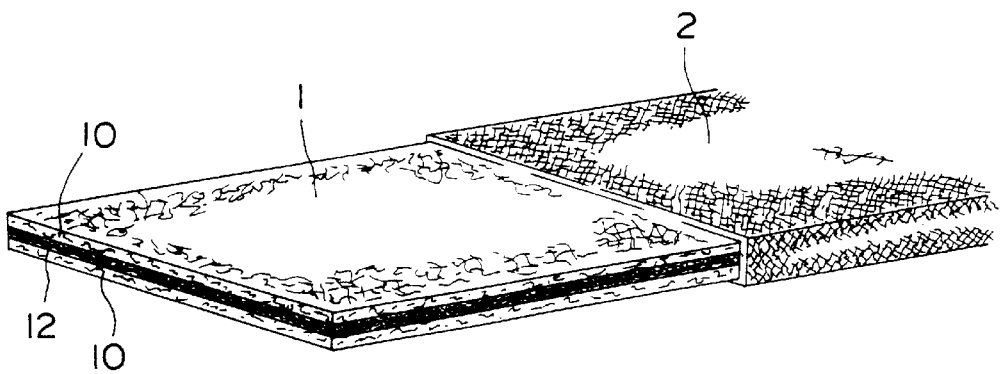
FIG. 12 is a partly broken-out perspective view of a sheet-like product of the heat-resisting material (formed by laminating the cut sheets of the heat-resisting material).
Figure 13:
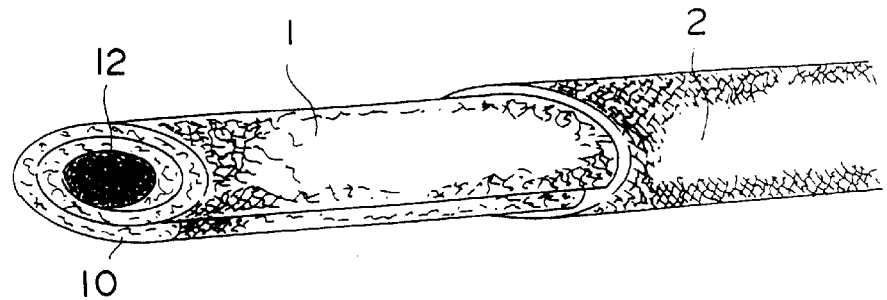
FIGS. 13 to 17 are the partly broken-out perspective views of the products of the heat-resisting material formed by rolling a sheet of the heat-resisting material.

The heat-resisting material according to the present invention using the ceramic short fibers are illustrated below with reference to the drawings. FIGS. 10 to 16 are the partly broken-out perspective views showing the products of the heat-resisting materials of the heat-resisting material, in which FIG. 10 shows a rope-like product of the heat-resisting material, FIG. 11 shows a square bar-like product of the heat-resisting material, and FIG. 12 shows a sheet-like product of the heat-resisting material. The products of the heat-resisting materials of FIGS. 10 to 12 are all obtained by laminating the properly sheet-like materials of the heat-resisting material and correspond to the previously described products of the heat-resisting materials of FIGS. 4 to 6, respectively, in which the fiber aggregate (1) is composed of alumina short fibers. The products of the heat-resisting materials of FIGS. 13 to 17 are all obtained by rolling a sheet-like material of the heat-resisting material, in which the products of the heat-resisting materials of FIGS. 13 and 14 correspond to the product of the heat-resisting material of FIG. 7 using a fiber aggregate composed of alumina short fibers, and the products of the heat-resisting materials of FIGS. 15 and 16 correspond to the product of the heat-resisting material of FIG. 8.

Figure 17:
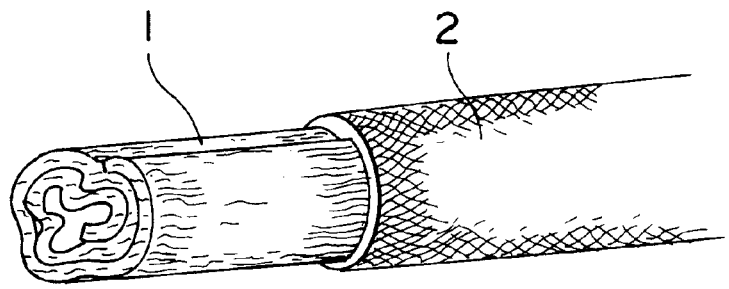

There were shown hereinabove the fiber aggregates of the structures in which the sheet-like material of the heat-resisting material are laminated with a relatively uniform thickness, but the present invention does not limit to those structure. For example, the structure illustrated in FIG. 17 is a preferred form for elevating compressibility. In the product of the heat-resisting material of FIG. 17, when the peripheral surface of the fiber aggregate is compressed after roll-up of the sheet-like material, the sheet-like material rolled-up is at least partly bent up.

In the heat-resisting material of the present invention described above, a heat-expansive material may be used in combination with alumina short fibers in the fiber aggregate (1). As such heat-expansive material, there can be used, for example, inorganic expansive materials, zeolite minerals and organic binders such as ethylene-based multi-component polymers. The inorganic expansive materials usable in the present invention include hollow glass microsheres, bentonite, expansive vermiculite, phlogopite, perlite, expansive graphite, and expansive fluoridized mica. In case where such heat-expansive material is contained in the fiber aggregate (1), the restoring property after consumption of the sheathing (2) are complemented by this heat-expansive material. Also, when heated, this material shows temporarily high expansive property, so that in use of the heat-resisting material of the present invention as a sealant for filling the spaces, it is possible to improve a shape conformability of the sealant to the shape of the application portion.

In case where a heat-expansive material is used in the heat-resisting material of the present invention, the fiber aggregate (1) is obtained, for instance, by laminating the heat-expansive material on a sheet-like material of alumina short fibers or ceramic short fibers by a dry lamination method, and binding the laminate into a predetermined shape and size, and then this fiber aggregate (1), in a state of being compressed to a degree not less than 10 vol % based on the volume of its normal-state volume, is covered with a sheathing (2). In the dry lamination method, the heat expansive material is uniformly spread or coated on the surface of the sheet of alumina short fibers, etc. The amount of the heat-expansive material used to the alumina short fibers is usually not more than 50 parts by weight, preferably 10 to 50 parts by weight, more preferably 20 to 40 parts by weight based on 100 in parts by weight of the alumina short fibers.

The heat-resisting material of the present invention has an excellent workability as it is possible to make a fiber aggregate containing alumina short fibers with a relatively small degree of compression. Also, in the fiber aggregate, there takes place no heat deterioration of the crystalline alumina short fibers constituting the fiber aggregate, and the fiber aggregate has a high restoring property, so that the heat-resisting material of the present invention, when used as a heat-insulating material or joint packing, has no risk of generating spaces or cracks and shows excellent heat insulation effect and sealing effect. Further, with the heat-resisting material according to the present invention, it is possible to significantly reduce the production cost by replacing a part of the alumina short fibers in the fiber aggregate with ceramic short fibers.

EXAMPLES

The present invention are described in more detail by way of examples. It should be understood, however, that these examples are not intended to limit the scope of the invention.

Example 1

Alumina short fibers were bundled to form a fiber aggregate (1), and this fiber aggregate (1) was continuously braided and covered with cotton yarn to form a sheathing (2) and then compressed approximately 10 vol % or more to produce a rope-like product of the heat-resisting material having a substantially circular sectional shape as shown in FIG. 1. Mullite fibers having an aluminum to silicon ratio (by weight) of 72:28 (calculated as $Al_2O_3$ and $SiO_2$) were used as alumina short fibers of the fiber aggregate (1). The fiber diameter was 4.1 μm, the fiber length is in the range of 20 to 200 mm, and the bulk density of the fiber aggregate (1) before compressed was 0.10 g/cm³. The sheathing (2) was made of cotton yarn with an apparent size of 0.3 mm. The average sectional diameter of the obtained heat-resisting material was 15 mm.

Then two test pieces, each being 1 meter in length, were prepared from the thus obtained product of the heat-resisting material, and the test pieces were put into a thermostatic tester kept at about 600° C. for heat-treatment for about one hour. One of the test pieces was inserted as joint packing into an opening 1.0 to 1.4 times the average diameter of the test pieces, formed by two steel plates in the thermostatic tester, while the other test piece was simply left in the thermostatic tester. As a result, the sheathing (2) was burned off, and the fiber aggregate (1) in one of the test pieces was restored to a state where the aggregate assumed a substantially rectangular sectional shape in conformity to the shape of the opening between the two steel plates and perfectly sealed the opening. The fiber aggregate in the other test piece was restored to the almost same size as before compressed. The compression percentage, expansion percentage and restoration percentage of the fiber aggregate (1) were as shown in Table 1.

Examples 2–6

The same procedure as defined in Example 1 was conducted except that the sectional size and compression percentage of the fiber aggregate (1) were changed to produce the test pieces of the heat-resisting material, and these test pieces were subjected to the same heat-treatment as conducted in Example 1. As a result, no deterioration of alumina short fibers in the fiber aggregate (1) took place and the fiber aggregate was restored substantially to the same size as before compressed. The compression percentage, expansion percentage and restoration percentage of the fiber aggregate (1) were as shown in Table 1.

TABLE 1

| | Fiber aggregate (1) before heating | | | |
|---|---|---|---|---|
| | Diameter (mm) | Bulk density in compressed state (g/cm³) | Mass (g/1m) | Volume before sheathed $\delta_0$ (cm³/1m) |
| Example 1 | 15.0 | 0.249 | 44 | 440 |
| Example 2 | 8.5 | 0.141 | 8 | 80 |
| Example 3 | 10.0 | 0.217 | 17 | 170 |
| Example 4 | 15.5 | 0.175 | 33 | 330 |
| Example 5 | 10.9 | 0.482 | 45 | 450 |
| Example 6 | 9.5 | 0.353 | 25 | 250 |

| | Fiber aggregate (1) before heating | | Fiber aggregate (1) after heating | |
|---|---|---|---|---|
| | Volume after sheathed $\delta_1$ (cm³/1m) | Compression percentage Δ (%) | Diameter (mm) | Bulk density (g/cm³) |
| Example 1 | 176.6 | 59.8 | 22.4 | 0.112 |
| Example 2 | 56.7 | 29.1 | 10.0 | 0.101 |
| Example 3 | 78.5 | 53.9 | 14.2 | 0.107 |
| Example 4 | 188.6 | 42.9 | 20.1 | 0.104 |
| Example 5 | 73.3 | 79.3 | 19.6 | 0.149 |
| Example 6 | 70.8 | 71.6 | 16.2 | 0.122 |

| | Fiber aggregate (1) after heating | | |
|---|---|---|---|
| | Restoration percentage η (%) | $\delta_2$ (cm³/1m) | Expansion percentage E (%) |
| Example 1 | 83.0 | 395 | 124 |
| Example 2 | 93.2 | 78 | 38 |
| Example 3 | 86.7 | 158 | 101 |
| Example 4 | 90.5 | 317 | 68 |
| Example 5 | 58.3 | 293 | 300 |
| Example 6 | 74.9 | 205 | 190 |

Notes

Expansion percentage E: The restoration percentage from the compressed state of the fiber aggregate (1).

$$E=\{(\delta_2-\delta_1)/\delta_1\}\times 100$$

Compression percentage Δ: The compression percentage against the normal-state volume of the fiber aggregate (1).

$$\Delta=\{(\delta_0-\delta_1)/\delta_0\}\times 100$$

Restoration percentage η: The restoration percentage as against the compression percentage of the fiber aggregate (1).

$$\eta=\{(\delta_2-\delta_1)/(\delta-\delta_1)\}\times 100$$

$\delta_1$: The volume per 1 m of the fiber aggregate (1) after sheathing.

$\delta_0$: The volume per 1 m of the fiber aggregate (1) before sheathing.

$\delta_2$ The volume restored from the compressed state.

Example 7

Figure 14:
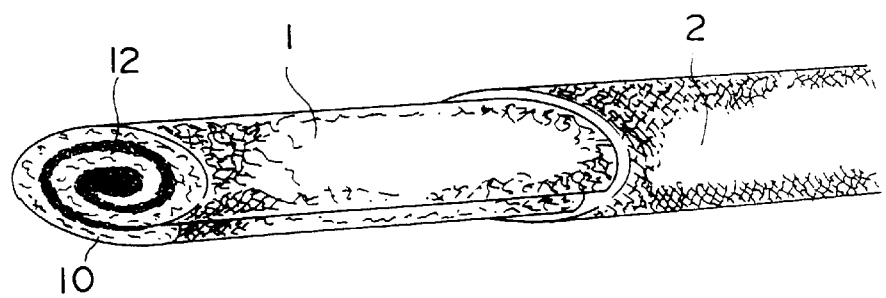
Figure 15:
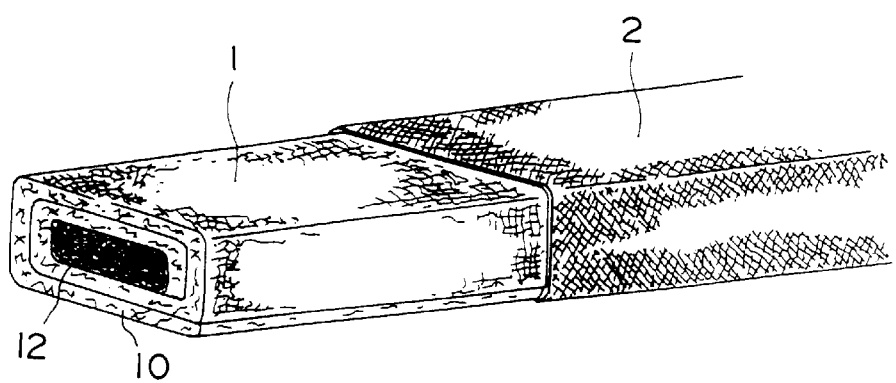
Figure 16:
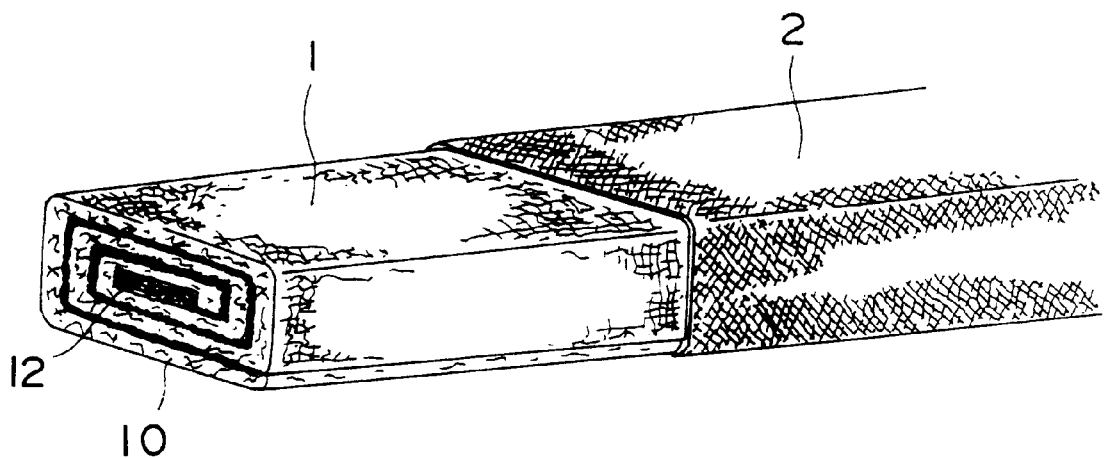

A blanket of crystalline alumina short fibers (10) and a blanket of ceramic short fibers (12) were rolled up together to form a volute fiber aggregate (1) as shown in FIG. 14. Each of the blankets (10) and (14) were 6 mm in thickness and 0.10 g/cm³ in bulk density. The fiber aggregate (1) was continuously braided and covered with cotton yarn to form a sheathing (2) and then compressed approximately 10 vol % or more to produce a rope-shaped product of the heat-resisting material having a substantially circular sectional shape as shown in FIG. 14.

The weight ratio of alumina short fibers to ceramic short fibers in the fiber aggregate (1) was 50:50. Mullite fibers having an aluminum to silicon ratio (by weight) of 72:28 (calculated as $Al_2O_3$ and $SiO_2$) were used as the alumina short fibers contained in the fiber aggregate (1). The fiber diameter was 4.1 μm and the fiber length was in the range of 20 to 200 mm. The ceramic short fibers used were those having an aluminum to silicon ratio (by weight) of 45:55 (calculated as $Al_2O_3$ and $SiO_2$). The fiber diameter was 2.3 μm and the fiber length was in the range of 40 to 80 mm. The bulk density of the fiber aggregate (1) before compression was 0.1 g/cm³. The sheathing (2) was made of cotton yarn with an apparent size of 0.3 mm. The average sectional diameter of the thus obtained product of the heat-resisting material was 15 mm.

Two test pieces of this product of the heat-resisting material were put into a thermostatic tester kept at about 600° C. and heat treated for about one hour. One of the test pieces was inserted as joint packing into an opening 1.1 to 1.4 times the average diameter of the test pieces, formed by two steel plates in the thermostatic tester, while the other test piece was simply left in the thermostatic tester. As a result, the sheathing (2) was burned off and the fiber aggregate (1) in one of the test pieces was restored to a state where the aggregate assumed a substantially rectangular sectional shape in conformity to the shape of the opening between the two steel plates and perfectly sealed the opening. The fiber aggregate (1) in the other test piece was restored to the substantially same size as before compressed. The compression percentage, expansion percentage and restoration percentage of the fiber aggregate (1) were as shown in Table 2.

Examples 8–11

The same procedure as defined in Example 7 was conducted except that the sectional size and the compression percentage of the fiber aggregate (1) were changed to produce the test pieces of the heat-resisting material and they were subjected to the same heat-treatment as conducted in Example 1. As a result, no deterioration of alumina short fibers in the fiber aggregate (1) was observed, and the fiber aggregate was restored to the substantially same size as before compression. The compression percentage, expansion percentage and restoration percentage of the fiber aggregate (1) were as shown in Table 2.

TABLE 2

| | Fiber aggregate (1) before heating | | | |
|---|---|---|---|---|
| | Diameter (mm) | Bulk density in compressed state (g/cm³) | Mass (g/1m) | Volume before sheathed $δ_0$ (cm³/1m) |
| Example 7 | 15.0 | 0.278 | 49 | 491 |
| Example 8 | 24.5 | 0.150 | 71 | 707 |
| Example 9 | 12.0 | 0.435 | 49 | 491 |
| Example 10 | 16.0 | 0.352 | 71 | 707 |

TABLE 2-continued

| | Fiber aggregate (1) before heating | | Fiber aggregate (1) after heating | |
|---|---|---|---|---|
| | Volume after sheathed $δ_1$ (cm³/1m) | Compression percentage Δ (%) | Diameter (mm) | Bulk density (g/cm³) |
| Example 7 | 177 | 64.0 | 22.3 | 0.126 |
| Example 8 | 471 | 33.4 | 29.0 | 0.107 |
| Example 9 | 113 | 77.0 | 19.3 | 0.168 |
| Example 10 | 201 | 71.6 | 25.5 | 0.139 |

| | Fiber aggregate (1) after heating | | |
|---|---|---|---|
| | Restoration percentage η (%) | $δ_2$ (cm³/1m) | Expansion percentage E (%) |
| Example 7 | 68.0 | 391 | 121 |
| Example 8 | 79.4 | 658 | 40 |
| Example 9 | 47.8 | 294 | 161 |
| Example 10 | 61.4 | 512 | 155 |

Notes

Expansion percentage E: The restoration percentage from the compressed state of the fiber aggregate (1).

$$E=\{(δ2-δ1)/δ1\}×100$$

Compression percentage Δ: The compression percentage against the normal-state volume of the fiber aggregate (1).

$$Δ=\{(δ0-δ1)/δ0\}×100$$

Restoration percentage η: The restoration percentage as against the compression percentage of the fiber aggregate (1).

$$η=\{(δ2-δ1)/(δ0-δ1)\}×100$$

$δ_1$: The volume per 1 m of the fiber aggregate (1) after sheathing.

$δ_0$: The volume per 1 m of the fiber aggregate (1) before sheathing.

$δ_2$: The volume restored from the compressed state.

Example 12

A blanket of alumina short fibers (10) was rolled with a heat expansive material (13) spreaded uniformly therein to form a fiber aggregate (1). The blanket was 3 mm in thickness and had a bulk density of 0.1 g/cm³. Vermiculite flakes were used as the heat expansive material (13). The sheathing ratio of heat expansive material (13) to alumina short fibers (10) was 20 parts by weight based on 100 parts by weight of the alumina short fibers (10).

The fiber aggregate (1) was continuously braided and wrapped with cotton yarn to form a sheathing (2) and compressed approximately 10 vol % or more to produce a rope-shaped product of the heat-resisting material having a substantially circular sectional shape as shown in FIG. 7. Mullite fibers having an aluminum to silicon ratio (by weight) of 72:28 (calculated as $Al_2O_3$ and $SiO_2$) were used as alumina short fibers. The fiber diameter was 4.1 μm and the fiber length was in the range of 20 to 200 mm. The bulk density of the fiber aggregate (1) before compression was about 0.12 g/cm³. The sheathing (2) is made of cotton yarn having an apparent size of 0.3 mm. The average sectional diameter of this product of the heat-resisting material was 15 mm.

Two test pieces, each being 1 m in length, were prepared from the product of the heat-resisting material, and the test pieces were heated in a thermostatic tester kept at a temperature of approximately 600° C. for about one hour. One of the test pieces was inserted as joint packing into an opening 0.1 to 1.4 times the average diameter of the test pieces, formed by two steel plates in the thermostatic tester, while the other test piece was simply left in the thermostatic tester. As a result, the sheathing (2) was burned off and the fiber aggregate (1)in one of the test pieces was restored to a state where the aggregate assumed a substantially rectangular sectional shape in conformity to the shape of the opening between the two steel plates and perfectly sealed the opening. The fiber aggregate (1) in the other test piece was restored to the substantially same size as before compressed. The compression percentage, expansion percentage and restoration percentage of the fiber aggregate (1) were as shown in Table 3.

Examples 13–15

The same procedure as defined in Example 12 was conducted except that the sectional size and the compression percentage of the fiber aggregate (1) were changed to produce the samples of the heat-resisting material and they were subjected to the same heat-treatment as conducted in Example 12. As a result, there took place no deterioration of alumina short fibers (10) in the fiber aggregate (1) and the aggregate was restored to the substantially same size as before compression. The compression percentage, expansion percentage and restoration percentage of the fiber aggregate (1) were as shown in Table 3.

TABLE 3

| | Fiber aggregate (1) before heating | | | |
|---|---|---|---|---|
| | Diameter (mm) | Bulk density in compressed state (g/cm³) | Mass (g/1m) | Volume before sheathed $\delta_0$ (cm³/1m) |
| Example 11 | 15.0 | 0.333 | 59 | 491 |
| Example 12 | 24.5 | 0.180 | 85 | 707 |
| Example 13 | 12.0 | 0.522 | 59 | 491 |
| Example 14 | 16.0 | 0.422 | 85 | 707 |

| | Fiber aggregate (1) before heating | | Fiber aggregate (1) after heating | |
|---|---|---|---|---|
| | Volume after sheathed $\delta_1$ (cm³/1m) | Compression percentage $\Delta$ (%) | Diameter (mm) | Bulk density (g/cm³) |
| Example 11 | 177 | 64.0 | 25.0 | 0.120 |
| Example 12 | 471 | 34.4 | 30.6 | 0.116 |
| Example 13 | 113 | 77.0 | 22.3 | 0.151 |
| Example 14 | 201 | 71.6 | 29.2 | 0.127 |

| | Fiber aggregate (1) after heating | | |
|---|---|---|---|
| | Restoration percentage $\eta$ (%) | $\delta_2$ (cm³/1m) | Expansion percentage E (%) |
| Example 11 | 99.8 | 490 | 154 |

TABLE 3-continued

| Example 12 | 111.8 | 735 | 56 |
| Example 13 | 73.4 | 390 | 245 |
| Example 14 | 92.5 | 669 | 233 |

Notes

Expansion percentage E: The restoration percentage from the compressed state of the fiber aggregate (1).

$$E=\{(\delta_2-\delta_1)/\delta_1\}\times 100$$

Compression percentage $\Delta$: The compression percentage against the normal-state volume of the fiber aggregate (1).

$$\Delta=\{(\delta_0-\delta_1)/\delta_0\}\times 100$$

Restoration percentage $\eta$: The restoration percentage as against the compression percentage of the fiber aggregate (1).

$$\eta=\{(\delta_2-\delta_1)/(\delta_0-\delta_1)\}\times 100$$

$\delta_1$: The volume per 1 m of the fiber aggregate (1) after sheathing.
$\delta_0$: The volume per 1 m of the fiber aggregate (1) before sheathing.
$\delta_2$: The volume restored from the compressed state.

What is claimed is:

1. A heat-resisting material comprising:
    a fiber aggregate formed in a continuously long product, comprising crystalline alumina-based short fibers and
    can inflammable sheathing for maintaining the shape of the fiber aggregate in a compressed state, and
    having an expansion percentage after burn-off of the sheathing of not less than 10% by volume based on the volume of fiber aggregate in a compressed state.

2. A heat-resisting material according to claim 1, wherein the expansion percentage of the fiber aggregate after burn-off of the sheathing is not less than 30% by volume based on the volume of fiber aggregate in a compressed state.

3. A heat-resisting material according to claim 1, wherein the fiber aggregate is compressed to not less than 10% by volume based on the volume of fiber aggregate in a normal state.

4. A heat-resisting material according to claim 3, wherein the fiber aggregate is compressed to 20 to 70% by volume based on the volume of fiber aggregate in a normal state.

5. A heat-resisting material according to claim 1, wherein the restoration percentage of the fiber aggregate after burn-off of the sheathing is not less than 10% by volume based on the volume of fiber aggregate in a normal state.

6. A heat-resisting material according to claim 5, wherein the restoration percentage of the fiber aggregate after burn-off of the sheathing is not less than 40% by volume based on the volume of fiber aggregate in a normal state.

7. A heat-resisting material comprising:
    a fiber aggregate formed in a continuously long product, comprising crystalline alumina-based short fibers, and
    an inflammable sheathing for maintaining the shape of the fiber aggregate in a compressed state,
    the fiber aggregate being compressed to an amount of not less than 10% by volume based on the volume of fiber aggregate in a normal state by the sheathing.

8. A heat-resisting material according to claim 7, wherein the fiber aggregate is compressed to 20 to 70% by volume based on the volume of fiber aggregate in a normal-state volume.

9. A heat-resisting material according to claim 7, wherein the restoration percentage of the fiber aggregate after burn-off of the sheathing is not less than 10% by volume based on the volume of fiber aggregate in a normal state.

10. A heat-resisting material according to claim 9, wherein the restoration percentage of the fiber aggregate after burn-off of the sheathing is not less than 40% by volume based on the volume of fiber aggregate in a normal state.

11. A heat-resisting material according to claim 7, wherein the expansion percentage of the fiber aggregate after burn-off of the sheathing is not less than 30% by volume based on the volume of fiber aggregate in a compressed state.

12. A heat-resisting material according to claim 7, wherein the weight ratio of aluminum to silicon in the alumina short fibers is 70:30 to 99:1, calculated as $Al_2O_3$ and $SiO_2$.

13. A heat-resisting material according to claim 7, having a rope-like shape before burn-off of the sheathing.

14. A heat-resisting material according to claim 7, having a square bar-like shape before burn-off of the sheathing.

15. A heat-resisting material according to claim 7, having a sheet-like or belt-like shape before burn-off of the sheathing.

16. A heat-resisting material according to claim 7, wherein the fiber aggregate is obtained by laminating a sheet-like material of said heat-resisting material.

17. A heat-resisting material according to claim 16, wherein the sheet-like material of said heat-resisting material is needle-punched.

18. A heat-resisting material according to claim 7, wherein the fiber aggregate is obtained by rolling a sheet-like material of said heat-resisting material.

19. A heat-resisting material according to claim 18, wherein the sheet-like material is needle-punched.

20. A heat-resisting material according to claim 7, wherein the fiber aggregate is obtained by coiling a metal wire or ceramic long fiber therearound, and a sheathing is disposed on the outer surface thereof.

21. A heat-resisting material according to claim 7, wherein the sheathing is made of long fibers.

22. A heat-resisting material according to claim 7, which is designed to be used as sealant for high-temperature furnaces.

23. A heat-resisting material according to claim 7, which is designed to be used as heat-insulating material for high-temperature furnace walls.

24. A heat-resisting material according to claim 7, wherein the fiber aggregate is a stratiform laminate comprising crystalline alumina short fibers and ceramic short fibers.

25. A heat-resisting material according to claim 24, wherein the expansion percentage of the fiber aggregate after burn-off of the sheathing is not less than 10% by volume based on the volume of fiber aggregate in a compressed state.

26. A heat-resisting material according to claim 25, wherein the expansion percentage of the fiber aggregate after burn-off of the heating is not less than 30% by volume based on the volume of fiber aggregate in a compressed state.

27. A heat-resisting material according to claim 24, wherein the restoration percentage of the fiber aggregate after burn-off of the sheathing is not less than 10% by volume based on the volume of fiber aggregate in a normal state.

28. A heat-resisting material according to claim 27, wherein the restoration percentage of the fiber aggregate after burn-off of the sheathing is not less than 40% by volume based on the volume of fiber aggregate in a normal state.

29. A heat-resisting material according to claim 24, wherein the weight ratio of alumina short fibers to ceramic short fibers in the fiber aggregate is 30:70 to 70:30.

30. A heat-resisting material according to claim 24, wherein the weight ratio of aluminum to silicon in the alumina short fiber is 70:30 to 99:1, calculated as $Al_2O_3$ and $SiO_2$.

31. A heat-resisting material according to claim 24, wherein the weight ratio of aluminum to silicon in the ceramic short fibers is 20:80 to 69:31, calculated as $Al_2O_3$ and $SiO_2$.

32. A heat-resisting material according to claim 24, wherein the ceramic short fibers contain a heat-expansive material.

33. A heat-resisting material according to claim 32, wherein the content of the heat-expansive material is 10 to 50 parts by weight based on 100 parts by weight of the fiber aggregate.

34. A heat-resisting material according to claim 24, wherein the bulk density of the fiber aggregate before compression is 0.05 to 0.3 $g/cm^3$.

35. A heat-resisting material according to claim 24, wherein the bulk density of the fiber aggregate in the compressed state is 0.1 to 0.6 $g/cm^3$.

36. A heat-resisting material according to claim 7, wherein the fiber aggregate comprises crystalline alumina short fibers and a heat-expansive material.

37. A heat-resisting material according to claim 36, wherein the expansion percentage of the fiber aggregate after burn-off of the sheathing is not less than 10% by volume based on the volume of fiber aggregate in a compressed state.

38. A heat-resisting material according to claim 37, wherein the expansion percentage of the fiber aggregate after burn-off of the sheathing is not less than 30% by volume based on the volume of fiber aggregate in a compressed state.

39. A heat-resisting material according to claim 36, wherein the restoration percentage of the fiber aggregate after burn-off of the sheathing is not less than 10% by volume based on the volume of fiber aggregate in a normal state.

40. A heat-resisting material according to claim 39, wherein the restoration percentage of the fiber aggregate after burn-off of the sheathing is not less than 40% by volume based on the volume of fiber aggregate in a normal state.

41. A heat-resisting material according to claim 36, wherein the weight ratio of aluminum to silicon in the alumina short fibers is 70:30 to 99:1, calculated as $Al_2O_3$ and $SiO_2$.

42. A heat-resisting material according to claim 36, wherein the content of the heat-expansive material is 10 to 50 parts by weight based on 100 parts by weight of the fiber aggregate.

43. A heat-resisting material according to claim 36, wherein the bulk density of the fiber aggregate before compression is 0.05 to 0.3 $g/cm^3$.

44. A heat-resisting material according to claim 36, wherein the bulk density of the fiber aggregate in the compressed state is 0.1 to 0.6 $g/cm^3$.

* * * * *